(12) United States Patent
Suresh et al.

(10) Patent No.: US 10,142,098 B2
(45) Date of Patent: *Nov. 27, 2018

(54) OPTIMIZED SHA-256 DATAPATH FOR ENERGY-EFFICIENT HIGH-PERFORMANCE BITCOIN MINING

(71) Applicant: Intel Corporation, Santa Clara, CA (US)

(72) Inventors: Vikram B. Suresh, Hillsboro, OR (US); Sudhir K. Satpathy, Hillsboro, OR (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/196,698

(22) Filed: Jun. 29, 2016

(65) Prior Publication Data

US 2018/0006808 A1    Jan. 4, 2018

(51) Int. Cl.
*H04L 9/32* (2006.01)
*H04L 9/06* (2006.01)
*G09C 1/00* (2006.01)

(52) U.S. Cl.
CPC .............. *H04L 9/0643* (2013.01); *G09C 1/00* (2013.01); *H04L 2209/12* (2013.01)

(58) Field of Classification Search
CPC ...... H04L 9/0643; H04L 2209/12; G09C 1/00
USPC .......................................................... 713/181
See application file for complete search history.

(56) References Cited

U.S. PATENT DOCUMENTS

| | | |
|---|---|---|
| 2008/0107259 A1 | 5/2008 | Satou |
| 2009/0058478 A1 | 3/2009 | Lin |
| 2009/0119407 A1* | 5/2009 | Krishnan ............ H04L 63/0281 709/228 |
| 2010/0086127 A1 | 4/2010 | Grinchuk et al. |
| 2012/0084568 A1* | 4/2012 | Sarikaya ............... H04L 9/3066 713/176 |
| 2014/0093069 A1 | 4/2014 | Wolrich et al. |
| 2016/0109870 A1 | 4/2016 | Firu et al. |
| 2016/0112200 A1 | 4/2016 | Kheterpal et al. |
| 2016/0125040 A1 | 5/2016 | Kheterpal et al. |

(Continued)

FOREIGN PATENT DOCUMENTS

| | | |
|---|---|---|
| WO | 2015077378 A1 | 5/2015 |
| WO | 2016046821 A1 | 3/2016 |

OTHER PUBLICATIONS

PCT, International Search Report and Written Opinion of the International Searching Authority for International Application No. PCT/US2017/035136, dated Sep. 8, 2017, 13 pages.

(Continued)

*Primary Examiner* — Mohammad W Reza
(74) *Attorney, Agent, or Firm* — Lowenstein Sandler LLP

(57) ABSTRACT

A processing system includes a processor to construct an input message comprising a plurality of padding bits and a hardware accelerator, communicatively coupled to the processor, comprising a first plurality of circuits to perform a stage-1 secure hash algorithm (SHA) hash based on the input message, wherein the hardware accelerator comprises a first data path coupled between a first reference node and a first input node of the first plurality of circuits to feed a first padding bit of the plurality of padding bits to the first input node.

16 Claims, 14 Drawing Sheets

(56) References Cited

U.S. PATENT DOCUMENTS

2016/0164672 A1    6/2016  Karighattam et al.
2018/0004242 A1    1/2018  Suresh et al.
2018/0006807 A1    1/2018  Suresh et al.

OTHER PUBLICATIONS

Dr. Timo Hanke, "AsicBoost—A Speedup for Bitcoin Mining", Mar. 31, 2016 (rev.5), 10 pages.
A. Gowthaman et al., "Performance Study of Enhanced SHA-256 Algorithm", International Journal of Applied Engineering Research, ISSN 0973-4562 vol. 10, No. 4 (2015), 12 pages.
Robert P. McEvoy et al., "Optimisation of the SHA-2 Family of Hash Functions on FPGAs", Department of Electrical & Electronic Engineering, University College Cork, Ireland, Mar. 2006, 6 pages.
PCT, International Search Report and Written Opinion of the International Searching Authority for International Application No. PCT/US2017/035195 (L603PCT), dated Sep. 7, 2017 (10 pages).
PCT, International Search Report and Written Opinion of the International Searching Authority for International Application No. PCT/US2017/035191 (L635PCT), dated Sep. 8, 2017, 15 pages.

\* cited by examiner

US 10,142,098 B2

OPTIMIZED SHA-256 DATAPATH FOR ENERGY-EFFICIENT HIGH-PERFORMANCE BITCOIN MINING

TECHNICAL FIELD

The present disclosure relates to hardware accelerators and, more specifically, to a processing system including hardware accelerator implementing SHA-256 hash using optimized data paths.

BACKGROUND

Bitcoin is a type of digital currency used in peer-to-peer transactions. The use of Bitcoin in transactions may eliminate the need for intermediate financial institutes because Bitcoin may enforce authenticity and user anonymity by employing digital signatures. Bitcoin resolves the "double spending" problem (namely, using the same Bitcoin more than once by a same entity in different transactions) using block chaining, whereas a public ledger records all the transactions that occur within the Bitcoin currency system. Every block added to the block chain validates a new set of transactions by compressing a 1024-bit message which includes a cryptographic root (e.g., the Merkle root) of the transaction along with bits representing other information such as, for example, a time stamp associated with the transaction, a version number, a target, the hash value of the last block in the block chain and a nonce. The process of validating transactions and generating new blocks of the block chain is commonly referred to as Bitcoin mining.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
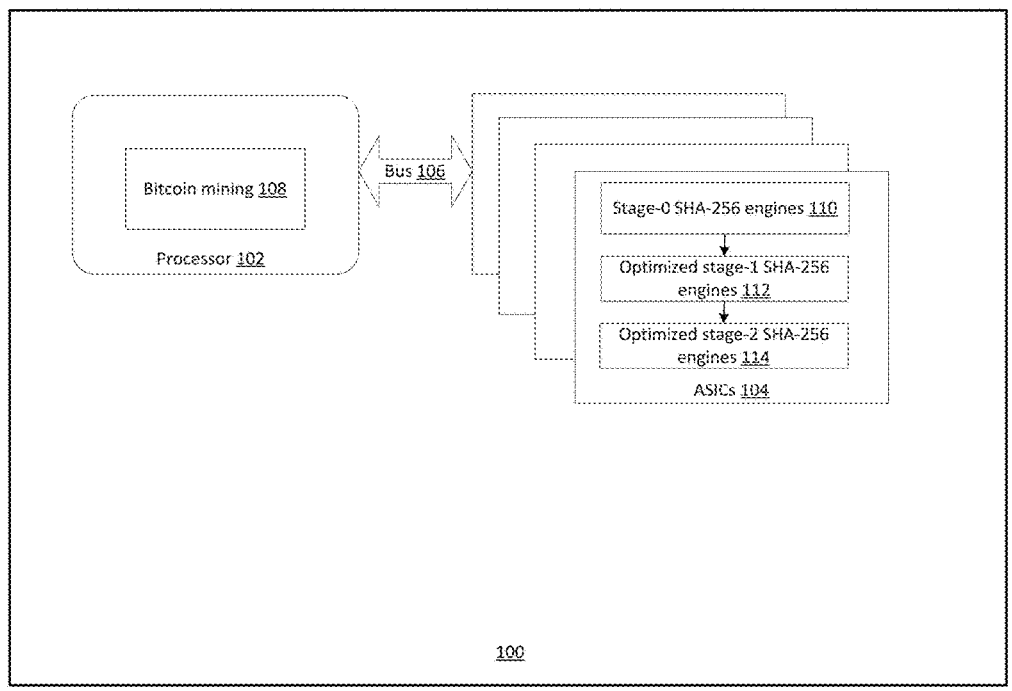
FIG. 1 illustrates a processing system to perform Bitcoin mining by employing energy-efficient hardware accelerators including SHA-256 engines according to an embodiment of the present disclosure.

The reward for a successful Bitcoin mining is the generation of a certain number of new Bitcoins (e.g., 25 Bitcoins) and the service fee associated with the transactions validated during the mining process. Each Bitcoin may be exchanged for currencies in circulation (e.g., U.S. dollars) or used in transactions with merchants that accept Bitcoins. Bitcoin mining may be associated with certain costs such as, for example, the computing resources consumed to perform Bitcoin mining operations. The most expensive operation in Bitcoin mining involves the computationally-intensive task of determining the validity of a 32-bit nonce. The nonce is a number or a string of bits that is used only once. A 32-bit nonce is a number (or a string of bits) that is represented by 32 bits. The 32-bit nonce may be part of a 1024-bit input message that may also include the Merkle root, the hash of the last chain block, and other parameters. The 1024-bit message may be hashed using three stages of a secure hash algorithm (e.g., SHA-256) to produce a 256-bit hash value that may be compared to a target value also contained in the input message to determine the validity of the nonce. The operations to calculate the hash value are commonly performed on hardware accelerators (e.g., the SHA-256 hash may be performed on application-specific integrated circuits (ASICs)) and may consume a lot of power. The power consumption by the hardware accelerators is the recurring cost for the Bitcoin mining. Embodiments of the present disclosure provide technical solutions including hardware accelerators to perform energy-efficient Bitcoin mining using energy-efficient clock system.

Dedicated Bitcoin mining ASICs are used to implement multiple SHA-256 engines that may deliver a performance of thousands of hashes per second while consuming power of greater than 200 W. Embodiments of the present disclosure employ micro-architectural optimizations including selective hardwiring certain parameters in Bitcoin mining computation. The hardwiring of these parameters eliminate the need for recursive rounds of computations of these parameters and reduce the overall circuit area and power consumption by about 15%.

Bitcoin mining operations include operations to generate a 256-bit hash value from a 1024-bit message. The operations are part of cryptographic hash that is one-way (very hard to reverse) and collision-resistant. The hash operations may include two stages (stage-0 and stage-1) of SHA-256 hash to compress a 1024-bit input message into intermediate results, followed by another round (stage-2) of SHA-256 hash applied to the intermediate results generated by the first two stages of SHA-256 hash. The 1024-bit input message to the three stages of SHA-256 hash contains header information, a 32-bit nonce, and padding bits. The padding bits may include 1s and 0s that are generated using a padding generation formulae. The 32-bit nonce is incremented every cycle of the Bitcoin mining process to generate an updated input message, where each cycle takes approximate 10 minutes. A valid nonce is identified if the final hash value contains a certain number of leading zeros. A miner may use the valid nonce as a proof of a successful Bitcoin mining.

The software application of Bitcoin mining may be implemented on a processing system including processors executing Bitcoin mining applications and dedicated hardware accelerators such as, for examples, ASICs containing clusters of SHA engines that run in parallel to deliver high-performance SHA-256 hash operations. The clusters of SHA engines may consume a lot of powers (e.g., at a rate of greater than 200 W). Embodiments of the present disclosure include energy-efficient ASIC-based SHA engines that consume less power for Bitcoin mining operations.

FIG. 1 illustrates a processing system 100 to perform Bitcoin mining by employing energy-efficient hardware accelerators including SHA-256 engines according to an embodiment of the present disclosure. As shown in FIG. 1, processing system 100 (e.g., a system-on-a-chip (SOC)) may include a processor 102 and ASICs 104 communicatively coupled to processor 102 via a bus 106. Processor 102 may be a hardware processing device such as, for example, a central processing unit (CPU) or a graphic processing unit (GPU) that includes one or more processing cores (not shown) to execute software applications. Processor 102 may execute a Bitcoin mining application 108 which may include operations to employ multi-stage of SHA-256 hash to compress a 1024-bit input message. For example, Bitcoin mining application 108 may delegate the calculation of the three stages of SHA-256 hash to hardware accelerators such as, for example, SHA-256 engines 110 to perform stage-0 hash, SHA-256 engines 112 to perform stage-1 hash, and SHA-256 engines 114 to perform stage-2 hash. These SHA-256 engines are implemented on one or more ASICs 104. Each one of ASICs 104 may contain multiple SHA-256 engines (e.g., >1000) that run in parallel. Embodiments of the present disclosure may take advantage of characteristics of different stages of SHA-256 hash to implement them in energy efficient manners to save power consumption in Bitcoin mining.

The three stages of SHA-256 hash engines 110, 112, 114 are used to convert a 1024 input message into a 256-bit hash output that is compared to a 256-bit target value to determine whether a 32-bit nonce in the input message is a valid proof of successful Bitcoin mining Each one of the SHA-256 hash engines 110, 112, 114 may receive a 512-bit input and include 64 rounds of calculation which uses the 512-bit input to compress eight 32-bit state (A, B, C, D, E, F, G, H) stored in eight registers (a, b, c, d, e, f, g, h). Each round of the compression is achieved by applying compression functions to the eight states.

In some implementations of ASICs 104, the input message, state data, and input values to multi-stage SHA-256 engines 110, 112, 114 are stored in registers (e.g., an array of flip-flop circuits or level-sensitive latches). However, certain portions of the input message, state data, and input values to multi-stage SHA-256 engines 110, 112, 114 may be fixed to constant data values during SHA-256 hashes or during certain rounds of computation in the SHA-256 hash. Rather than providing these constants using registers, embodiments of the present disclosure hardwire these constant data values to the circuits performing SHA-256 hash, thus reducing the energy consumption compared to providing these constants using registers that may be enabled by clock signals. In one embodiment, certain data paths of stage-1 SHA-256 engines and stage-2 SHA-256 engines are identified to be associated with constant parameters and are hardwired to improve the efficiency of power consumption. As shown in FIG. 1, these stage-1 SHA-256 engines and stage-2 SHA-256 engines are referred to as optimized stage-1 SHA-256 engines 112 and optimized stage-2 SHA-256 engines 114 implemented on ASICs 104.

Figure 2:
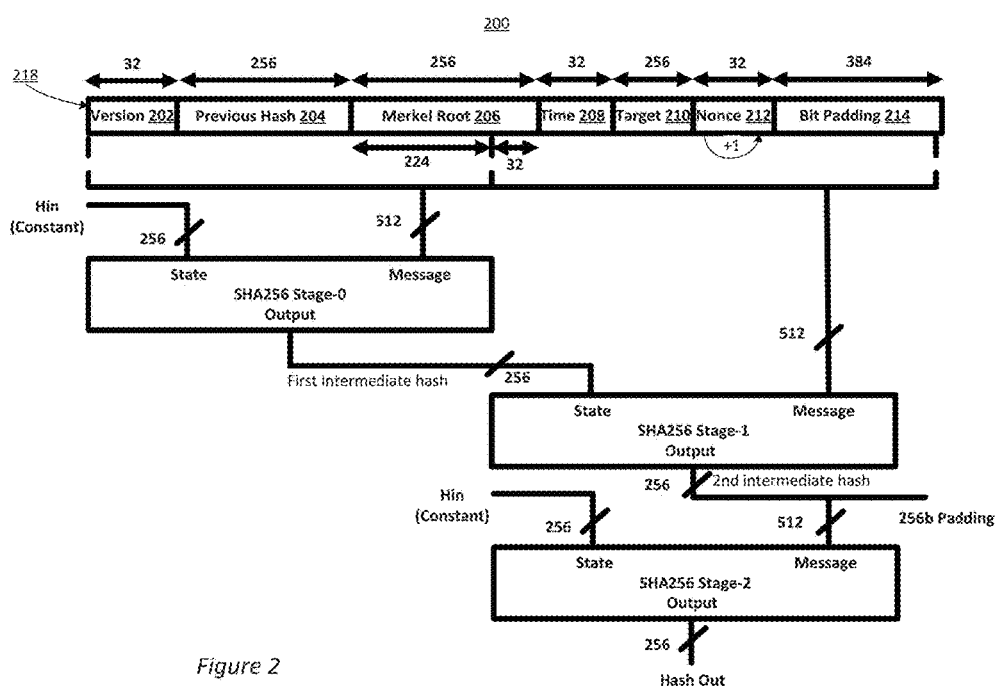
FIG. 2 illustrates a process to hash a 1024-bit message into a hash value using three stages of SHA-256 hash in Bitcoin mining.

FIG. 2 illustrates a process 200 to hash a 1024-bit message into a 256-bit hash value using three stages of SHA-256 hash during Bitcoin mining In SHA-256 hash, the hash value may be stored in eight state registers (a, b, c, d, e, f g, h) associated with each SHA-256 engine, where each of the state registers is a hardware register that stores a 32-bit word referred to as a state (represented by A, B, C, D, E, F, G, H). The initial values of these states can be 32-bit constants. Alternatively, the state registers may initially store a hash value calculated from a previous iteration of the hashing process. The states (A, B, C, D, E, F, G, H) are updated during SHA-256 hash calculation to generate a 256-bit hash value as the output. SHA-256 hash consumes a block of 512-bit message and compresses it into a 256-bit hash (A-H) stored in state registers (a-h). The Bitcoin mining process employs three stages of SHA-256 hash to convert the 1024-bit input message to a 256-bit hash value that may be compared to a target value to determine whether a Bitcoin has been identified.

The SHA-256 hash may include 64 rounds (identified as round 0, 1, . . . , 63) of applications of compression functions to the states stored in state registers. The compression function employs a 512-bit input value to manipulate the contents stored in registers (a-h). Table 1 illustrates the 64 rounds of the SHA-256 operations as applied to the states stored in registers (a-h) to generate a hash value that can be used to determine if a valid nonce is found as a proof of the identification of a Bitcoin.

TABLE 1

• Apply the SHA-256 compression function to update registers a, b, . . . , b •
For j = 0 to 63
{
    Compute Ch(e, f, g), Maj(a, b, c), $\Sigma_0(a)$, $\Sigma_1(e)$, and $W_j$ (see Definitions below)
    $T_1 \leftarrow h + \Sigma_1(e) + Ch(e, f, g) + K_j + W_j$
    $T_2 \leftarrow \Sigma_0(a) + Maj(a, b, c)$
      h ← g
      g ← f
      f ← e
      $e \leftarrow d + T_1$
      d ← c
      c ← b
      b ← a
      $a \leftarrow T_1 + T_2$
} where logic functions Ch(x, y, z), Maj(x, y, z), $\Sigma_0 x$, $\Sigma_1 x$ are compression functions that are defined according the SHA-256 specification, and each registers (a-h) is initiated with a 32-bit initial values, and $W_j$, j=0, . . . 63, are 32-bit values derived from a 512-bit message which can be part of the 1024-bit input message of the Bitcoin mining.

As shown in FIG. 2, the process of the Bitcoin mining 200 starts with a 1024-bit message 218. The 1024-bit input message 218 may be composed of header information, a nonce 212, and padding bits 214 that make the input message 218 to the length of 1024 bits. The header information may include a 32-bit version number 202, a 256-bit hash value 204 generated by the immediate preceding block in the block chain of Bitcoin public ledger, a 256-bit Merkle root 206 of the transaction, a 32-bit time stamp 208, and a 256-bit target value 210. Version number 202 is an identifier associated with the version of the block chain. Hash value 204 is the hashing result from the immediate preceding block in the block chain recorded in the public ledger. Merkle root 206 is the 256-bit hash based on all of the transactions in the block. Time stamp 208 represents the current time when the Bitcoin mining process starts. Target value 210 represents a threshold value that the resulting hash value generated by the Bitcoin mining is compared to. If the resulting hash value ("hash out") is smaller than the target value 210, the nonce 212 in the input message 218 is identified as a valid nonce that can be used as the proof of the identification of a Bitcoin. If the final result is no less than the target value 210, the nonce 212 is determined to be invalid, or the Bitcoin mining failed to find a Bitcoin. The value of nonce 212 may be updated (e.g., incremented by one), and the Bitcoin mining process is repeated to determine the validity of the updated nonce.

In one embodiment, instead of comparing the final hashing result with the target value, Bitcoin mining application may determine whether the hash out has a minimum number of leading zeros. The minimum number of leading zeros may ensure that the final hashing value is smaller than the target value. The target value (or the number of leading zeros) may be changed to adjust the complexity of Bitcoin mining: decreasing the target value decreases the probability of finding a valid nonce and hence increases the overall search space to generate a new block in the block chain. By modifying the target value 210, the complexity of the Bitcoin mining is adjusted to ensure that the time used to find a valid nonce is relative constant (approximately 10 minutes). For a given header, the Bitcoin mining application may sweep through the search space of $2^{32}$ possibilities to find a valid nonce. The Bitcoin mining process includes a series of mining iterations to sweeping through these possibilities of valid nonce. The header information is kept the same through these mining iterations while the nonce 212 is incremented by one.

Each Bitcoin mining calculation to find a valid nonce may include three stages (stage-0-stage-2) of SHA-256 hash calculations. Referring to FIG. 2, at stage-0 SHA-256 hash, the state (A, B, C, D, E, F, G, H) stored in state registers (a, b, c, d, e, f, g, h) may be initiated with eight 32-bit constants. Stage-0 SHA-256 hash may receive a 512-bit input message including the 32-bit version number 202, 256-bit hash value 204 from the last block in the block chain, and a portion (the first 224 bits) of Merkle root 206. Stage-0 SHA-256 hash may produce a first 256-bit intermediate hash value. The first intermediate hash value is then employed to initiate the state registers A-H of the stage-1 SHA-256 hash. The 512-bit input message to the stage-1 SHA-256 hash may include the rest portion (32 bits) of the Merkle root 206, 32-bit time stamp 208, 256-bit target value 210, 32-bit nonce 212, and 128 padding bits 214. Stage-1 SHA-256 hash may produce a second 256-bit intermediate hash value.

At the stage-2 SHA-256 hash, the state registers (a, b, c, d, e, f, g, h) of the stage-2 SHA-256 hash may be set with the 256-bit constant which is identical to the constant used in stage-0 SHA-256 hash. The 512-bit input message to the stage-2 SHA-256 hash may include the second 256-bit intermediate hash result (from the stage-1 SHA-256 hash output) combined with 256 padding bits to make a 512-bit input message to the stage-2 SHA-256 hash. The stage-2 SHA-256 hash may produce a third 256-bit hash value as the hash out for the three stages of SHA-256 hash. The Bitcoin mining application may then determine whether the hash out is smaller than the target value 210. If the hash out is smaller than the target value 210, the nonce 212 in the input message is identified as a valid nonce. If the hash out is no less than the target value 210, the nonce 212 is an invalid nonce. After the determination, nonce 212 is incremented to repeat the process to determine the validity of the updated nonce 212 using the process as shown in FIG. 2.

Since stage-0 SHA-256 hash involves only part of the header information but not the nonce itself, the calculation of stage-0 SHA-256 does not present an opportunity for Bitcoin specific optimization. By comparison, both stage-1 and stage-2 SHA-256 hash calculations receive input messages relating to the nonce 212 and hence present opportunities for Bitcoin mining optimizations.

Figure 3A:
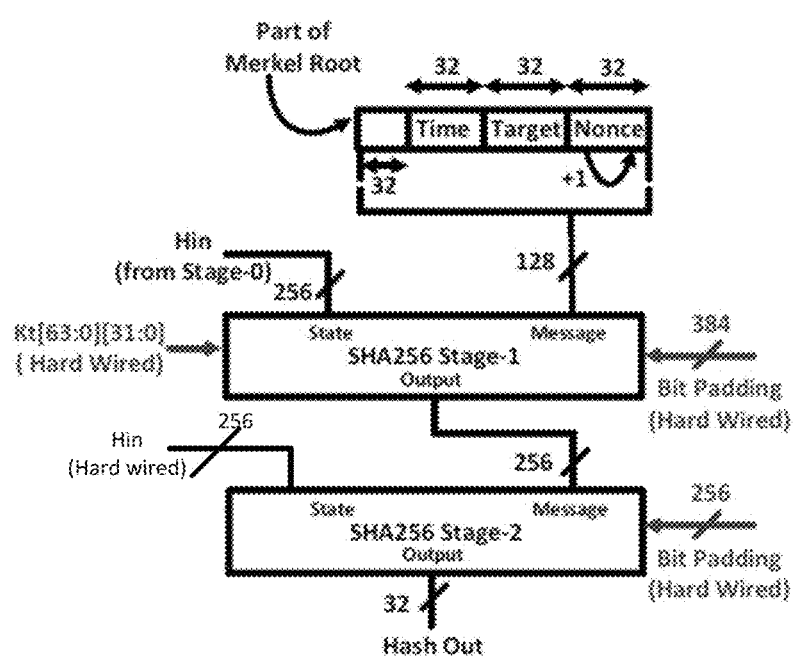
FIGS. 3A-3C illustrates optimized stage-1 SHA-256 and stage-2 SHA-256 engines according to embodiments of the present disclosure.

FIG. 3A illustrates optimized stage-1 SHA-256 and stage-2 SHA-256 engines according to an embodiment of the present disclosure. The input value to the stage-1 SHA-256 engine includes the 32 least significant bits (LSBs) of the Merkle root 206, 32-bit time stamp 208, 32-bit target value 210, 32-bit nonce 212, and the padding bits 214. The 32 LSBs of the Merkle root 206, 32-bit time stamp 208, 32-bit target value 210, and 32-bit nonce 212 may vary during the nonce validation process. The padding bits 214, however, are constant through different iterations (including stage-0 through stage-2 SHA-256 hashes) to validate different nonce. Thus, the padding bits, once chosen, can be provided by data paths that are hardwired to constant values.

In one embodiment, a constant value (or fixed value) is represented by a sequence of bits, where each bit can be "1" or "0." The "1" bits may be provided by a data path hardwired to a high voltage state, and inverters (or NOT gate) can be used to convert "1" bits to "0" bits. Thus, a sequence of constant bits can be provided by data paths including inverters and a reference voltage. In one embodiment, when the bits representing a value are hardwired data path, these bits are not stored in registers, thus reducing the circuit area and the power consumption to provide the same value to the SHA-256 engines. Hardwiring the constants may further help optimize the circuit logic consuming the constants by reducing logic area and power.

Similarly, the input value to the stage-2 SHA-256 engines also includes 256 padding bits that are fixed through different iterations to validate different nonce. These 256 padding bits may also be provided by a hardwired data path to a reference voltage or a hardwired data path to the reference voltage through an inverter.

As shown in Table 1, SHA-256 includes 64 rounds of compression calculation that includes applying compression functions to states (A, B, C, D, E, F, G, H) and the 512-bit input value. The states (A, B, C, D, E, F, G, H) are stored in registers (a, b, c, d, e, f, g, h) and are calculated through the 64 rounds of compression calculation. The 512-bit input value is split into 16 32-bit words ($W_j$, j=0, . . . , 15) that are employed as parameters of the compression functions in the first 16 rounds of compression calculation. Since the 512-bit input value to stage-1 SHA-256 engines includes fixed bits (e.g., the padding bits), the fixed bits may be provided using hardwired data paths to the compression calculation circuit for performing the rounds receiving the fixed bits. For example, rounds 4 through 15 of stage-1 SHA-256 may receive hardwired padding bits, and rounds 8 through 15 of stage-2 SHA-256 may also receive hardwired padding bits.

Further, the initial values of state (A, B, C, D, E, F, G, H) of stage-2 SHA-engines are fixed to constant values that do not change through different iterations to validate different nonce. Thus, the initial values provided to registers (a, b, c, d, e, f, g, h) can also be bits that are provided by hardwired data paths. The rounds of SHA-256 calculation may also require a 32-bit constant word that is unique to each round. In a fully unrolled design for sequential hardware for each round, the constant words can also be hardwired to optimize the circuits that perform these rounds of calculation.

Although Merkle root 206, time stamp 208, and target value 210 may be updated when a Bitcoin mining process fails to identify a valid nonce according to the Bitcoin mining protocols (e.g., spent less than 10 minutes to find a valid nonce or did not find a valid nonce in the $2^{32}$ nonce space), Merkle root 206, time stamp 208, and target value 210 commonly do not change during the search for a valid nonce in the $2^{32}$ nonce space. Thus, the 96 most significant bits (MSBs) of the input value to stage-1 SHA-256 engines may remain constant through the iterations during the search in the space of $2^{32}$ nonce. As shown in Table 1, rounds 0 through 2 of compression calculation within SHA-256 hash are based on the 96 MSBs of the input value and do not involve the value of nonce 212. Therefore, rounds 0 through 2 can be calculated once and used through the search of a valid nonce until any one of Merkle root 206, time stamp 208, and target value 210 is updated.

Figure 3B:
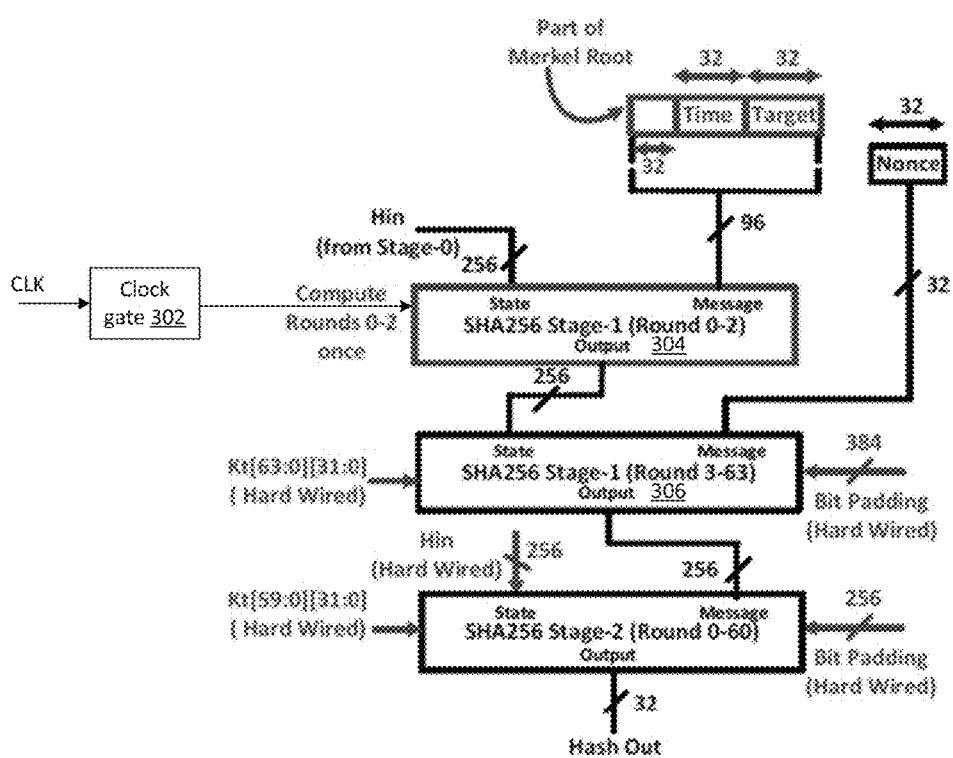

FIG. 3B illustrates further optimized stage-1 SHA-256 and stage-2 SHA-256 engines according to an embodiment of the present disclosure. As shown in FIG. 3B, 32-bit nonce 212 is directly provided to the circuits 306 that perform round 3 (and subsequently, rounds 4-63) bypassing rounds 0-2. The circuits 304 to perform rounds 0-2 may receive the 96 MSBs including 32 LSBs from Merkle root, 32 bit timestamp, and 32-bit target value and perform the calculation only once at the beginning of the process to identify a valid nonce. In one embodiment, a clock gate 302 is used to achieve the computation of rounds 0-2 once before disabling the computation of rounds 0-2. Clock gate 302 may include circuit that receive the system clock (CLK) and provide the enabling signals to registers (e.g., flip-flops or level-sensitive latches) at the start of Bitcoin mining process. Subsequent to the calculation using the 96 MSBs (e.g., after the first clock cycle), clock gate 302 may provide a disabling signal to registers in circuits 304 (e.g., registers (a, b, c, d, e, f, g, h) associated with rounds 0-2) so that the data stored in these registers maintain the same data in further calculation including rounds 3-63. Thus, the computation of rounds 0-2 are clock-gated to reduce the power consumption.

Further, as shown in Table 1, the registers (a, b, c, d, e, f, g, h) storing states (A, B, C, D, E, F, G, H) in round 2 provide constant values to registers (a, b, c, d, e, f, g, h) associated with round 3, registers (b, c, d, f, g, h) associated with round 4, registers (c, d, g, h) in round 5, and registers (d, h) in round 6. Thus, these registers associated with rounds 3-6 may be associated with data paths that are hardwired to registers (a, b, c, d, e, f, g, h) associated with round 2, eliminating the need for these registers to store states during computation. This may further reduce the circuit area used for rounds 0-6 and corresponding power consumption.

The variable portion of the input values to round 3 is the incrementing nonce. The nonce is incremented after the completion of stage-0 through stage-2 SHA-256 hashes during an iteration of Bitcoin mining. When the SHA-25 engines are implemented as a pipeline that validates one nonce per clock cycle, each increment of nonce may be coincident with one clock cycle. The state A and E stored in registers (a, e) are affected by the incrementing nonce every clock cycle. Thus, the states A and E can be computed once and then incremented every clock cycle to account for the increment of the nonce. This may further reduce the need for a complete computation of round 3 for every clock cycle and reduce the corresponding energy consumption for round 3.

Figure 3C:
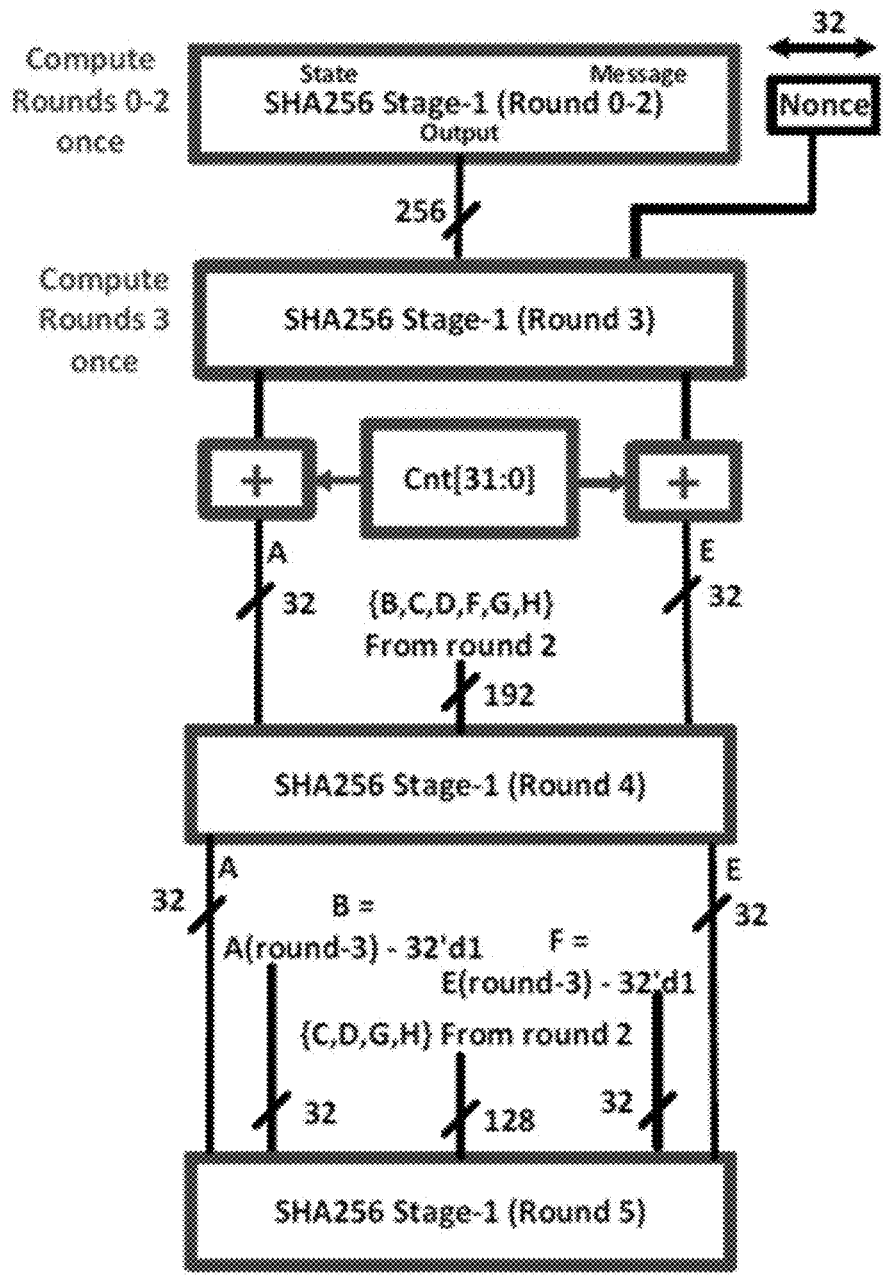

FIG. 3C illustrates further optimized stage-1 SHA-256 and stage-2 SHA-256 engines according to an embodiment of the present disclosure. As shown in FIG. 3C, in round 3, registers (b, c, d, f, g, h) may be associated with data paths hardwired to the corresponding registers in round 2. Registers (a, e) may be incremented every clock cycle to match the increment of nonce. In subsequent rounds, certain states may be directly derived from states A and E of round 3. For example, states (B, E) in round 4, states (B, C, F, G) in round 5, and states (B, C, D, F, G, H) in round 6 may be computed by subtracting a constant value from states (A, E) in round 3. Since these states in rounds 4-6 can be derived from state (A, E) in round 3, the need to store these states are eliminated. The circuit area for rounds 4-6 and the corresponding power consumption may be further reduced.

Figure 4:
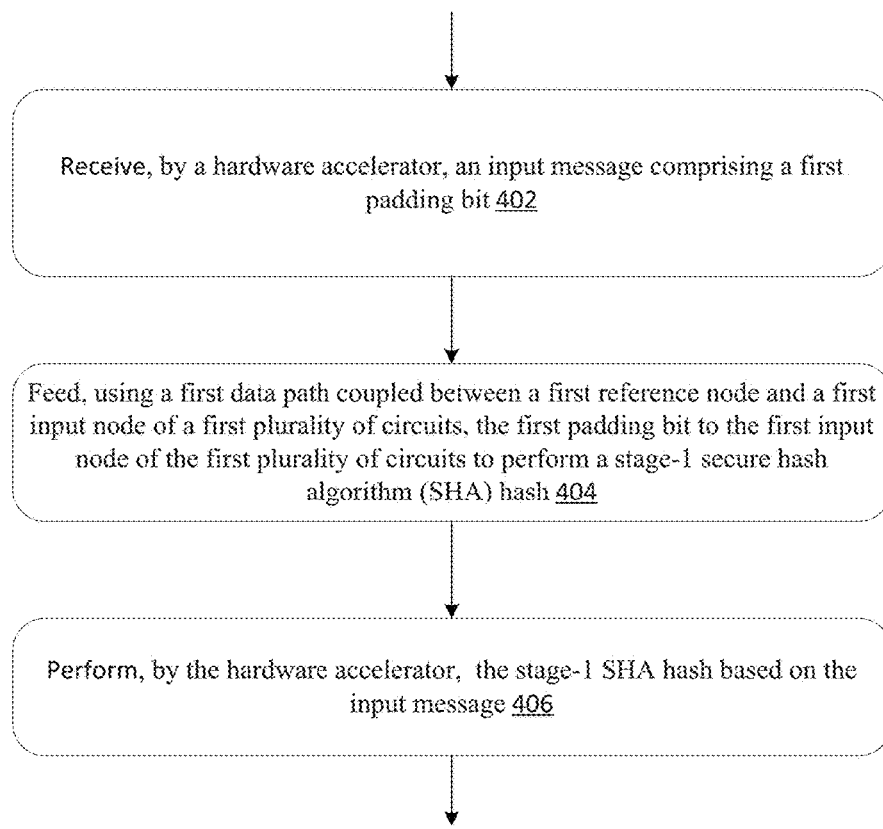
FIG. 4 is a block diagram of a method to use hardwired bits to perform SHA-256 in Bitcoin mining according to an embodiment of the present disclosure.

FIG. 4 is a block diagram of a method 400 to hardwired bits to perform SHA-256 in Bitcoin mining according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 and ASIC 104 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, a hardware accelerator 104 may include clusters of SHA engines to perform stage-1 SHA hash for the Bitcoin mining application executing on a processor 102. At 402, the hardware accelerator may receive a 1024-bit input message which may include header information, a nonce, and a number of padding bits.

At 404, the hardware accelerator may feed, using a first data path coupled between a first reference node and a first input node of a first plurality of circuits, the first padding bit to the first input node of the first plurality of circuits to perform a stage-1 secure hash algorithm (SHA) hash.

At 406, the hardware accelerator may perform the stage-1 SHA-256 hash based on the input message. The stage-1 SHA hash may be used to determine the validity of a nonce stored in the input message.

Figure 5A:
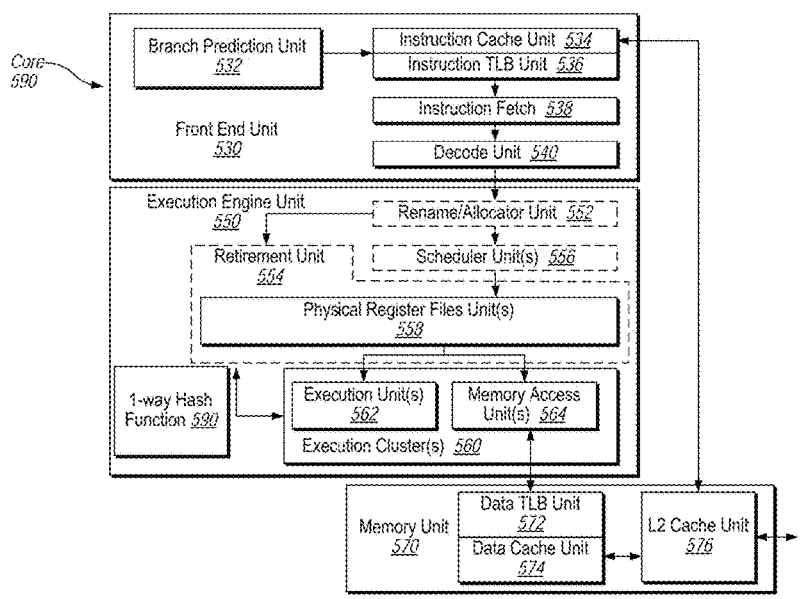
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
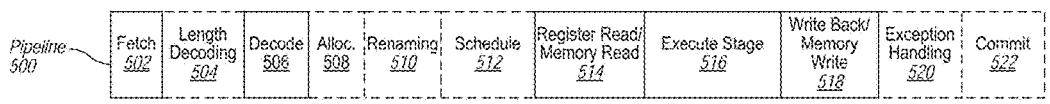
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
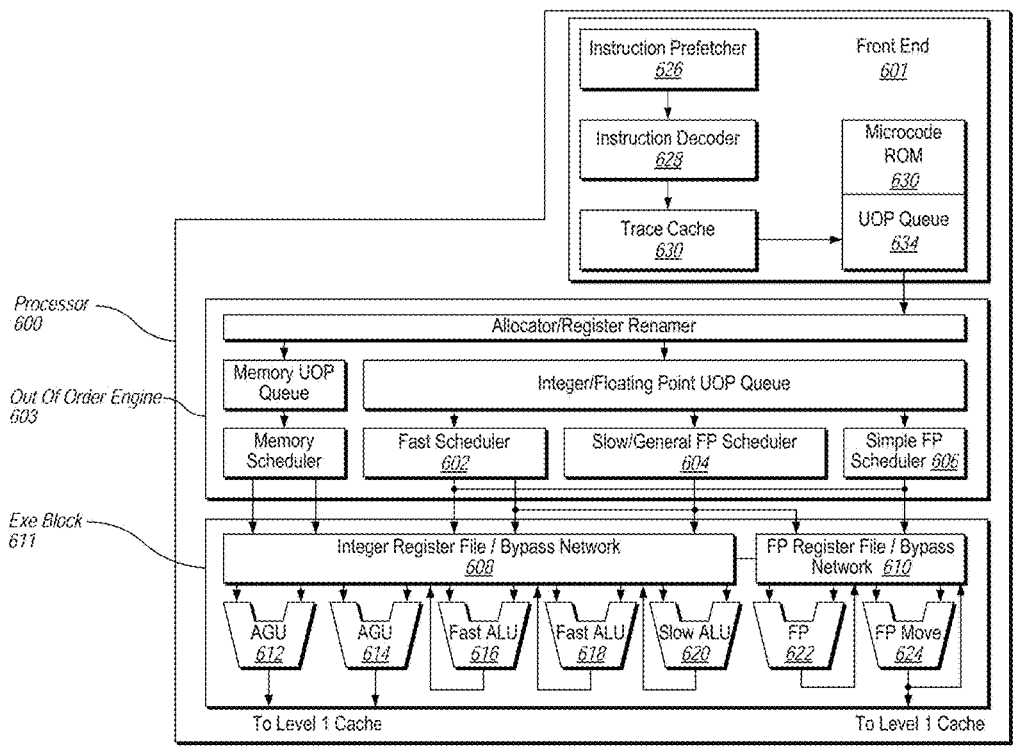
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
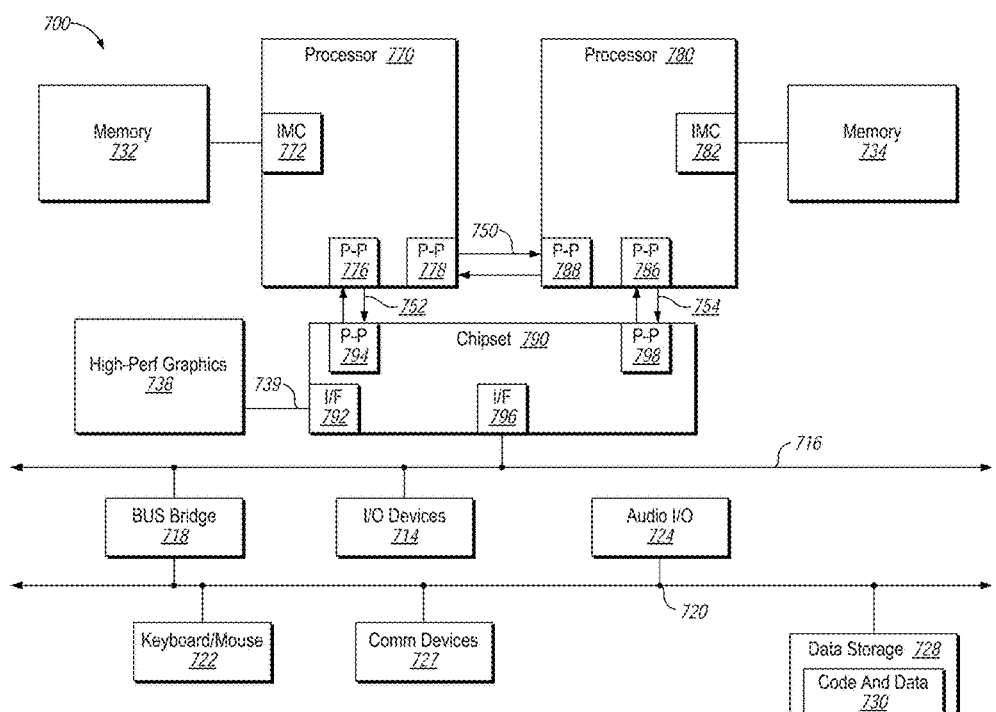
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
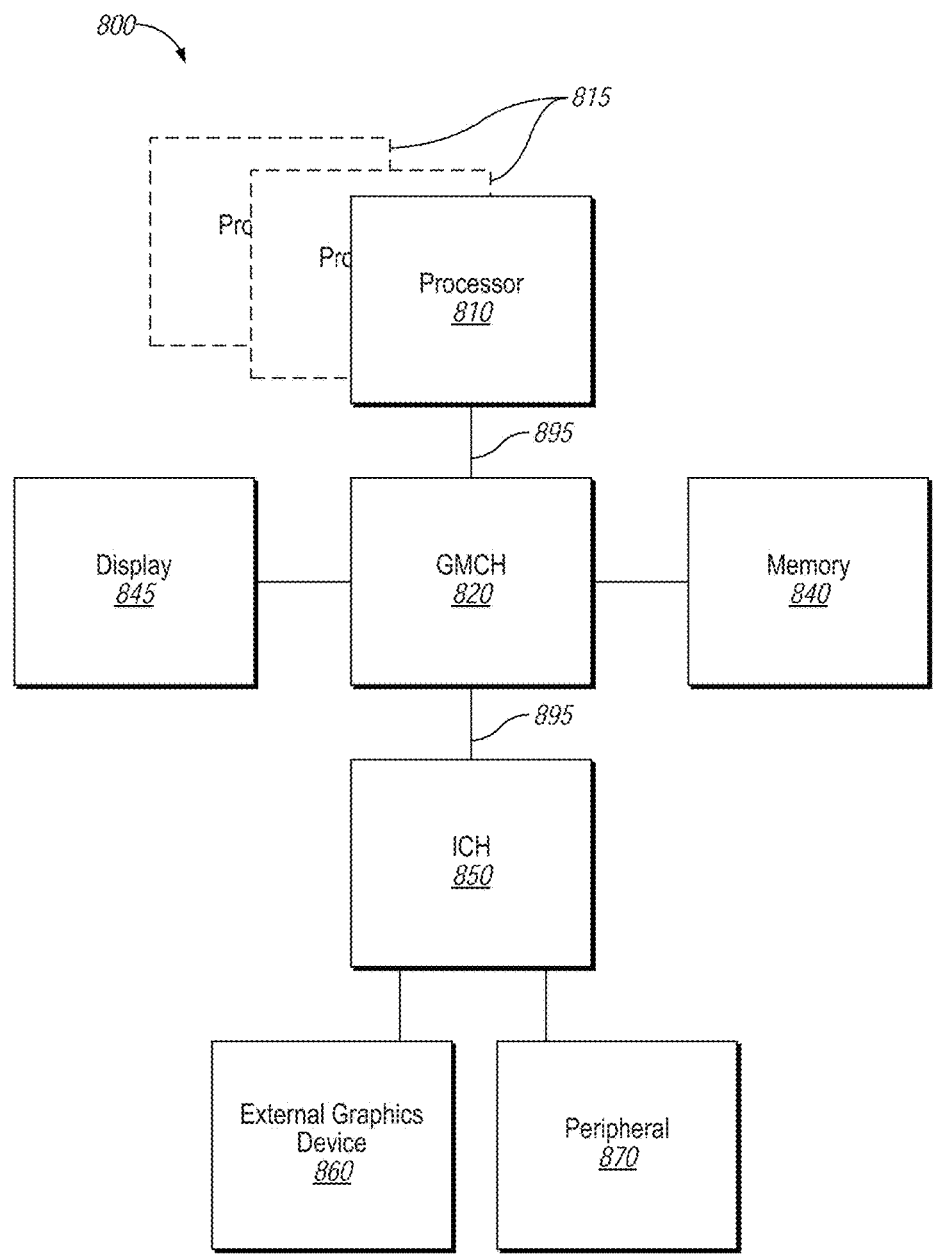
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
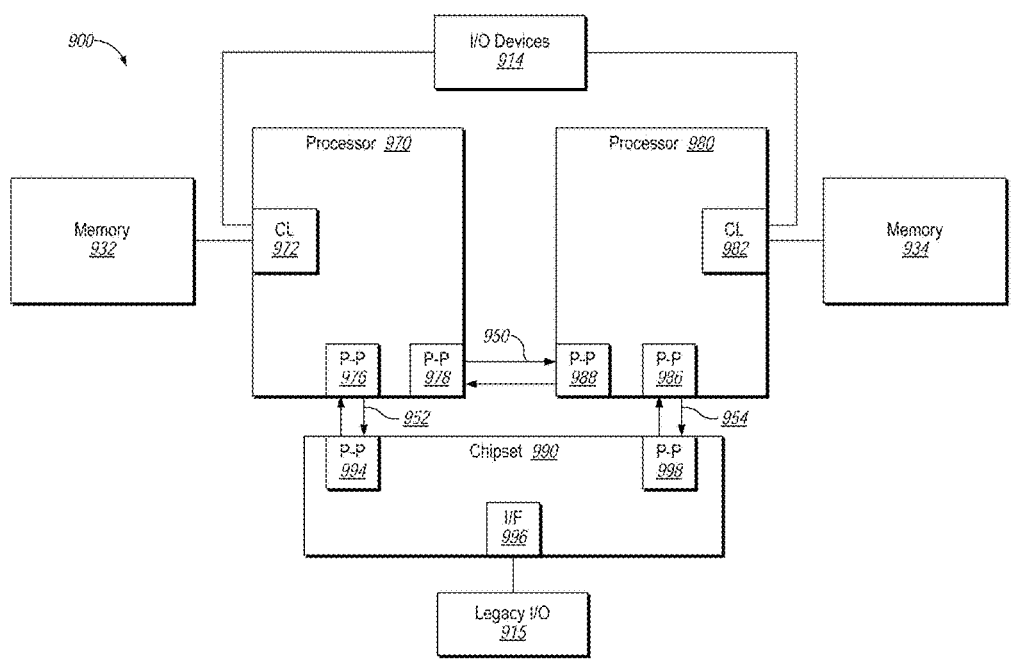
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
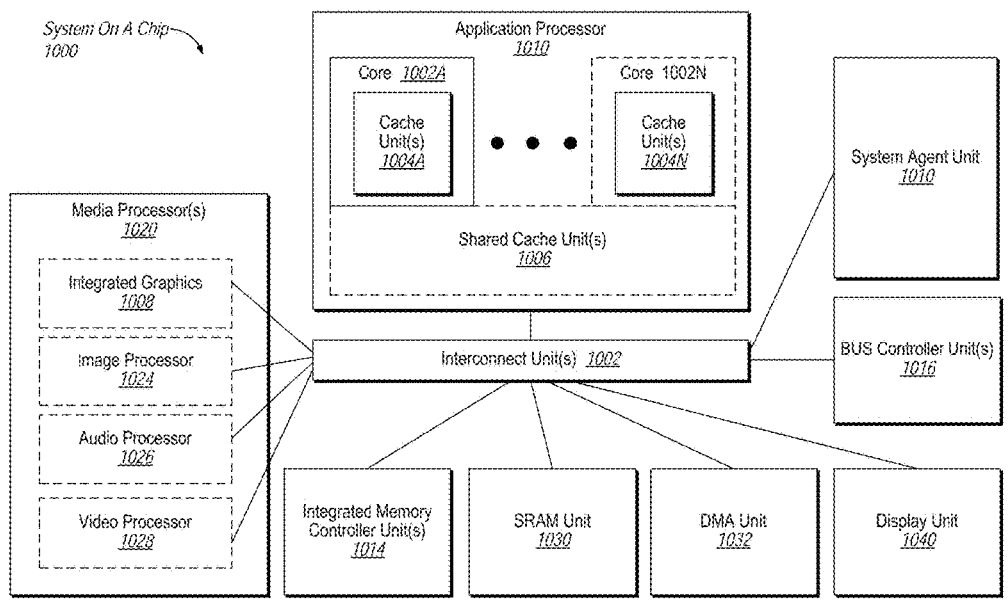
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
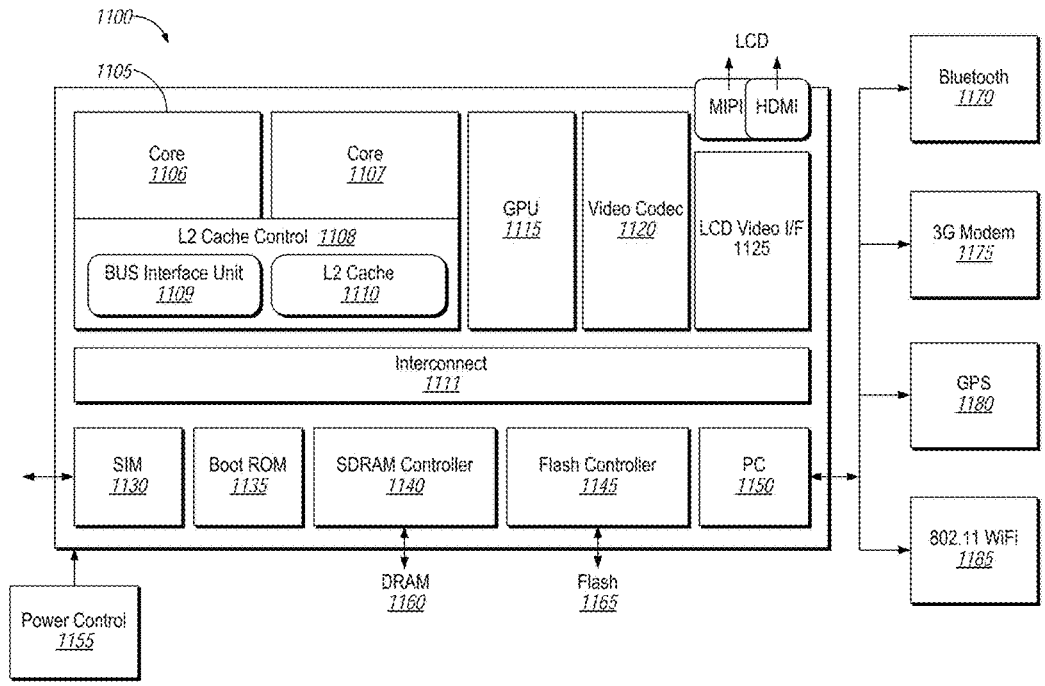
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
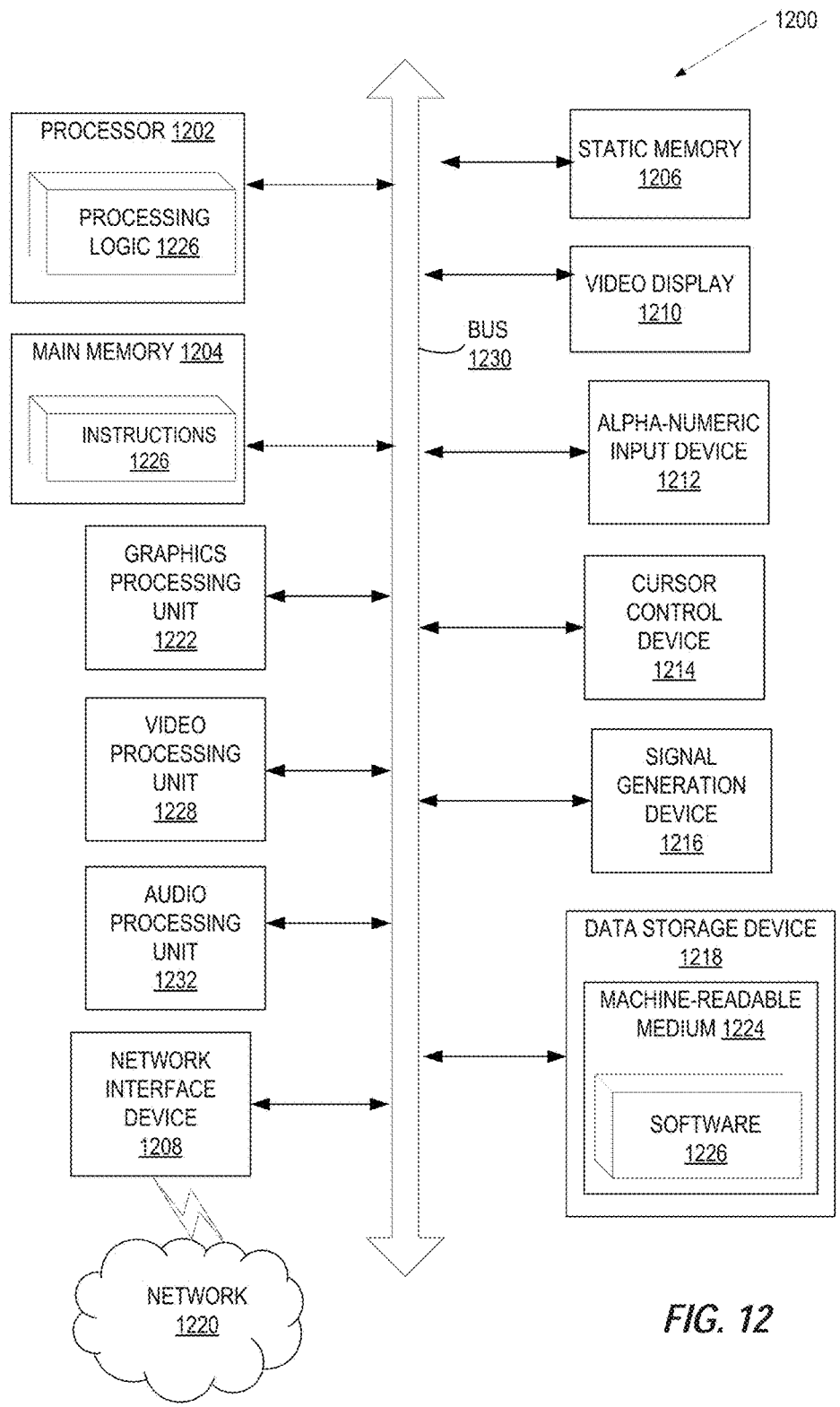
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing system including a processor to construct an input message comprising a plurality of padding bits and a hardware accelerator, communicatively coupled to the processor, comprising a first plurality of circuits to perform a stage-1 secure hash algorithm (SHA) hash based on the input message, wherein the hardware accelerator comprises a first data path coupled between a first reference node and a first input node of the first plurality of circuits to feed a first padding bit of the plurality of padding bits to the first input node.

In Example 2, the subject matter of Example 1 further provides that the hardware accelerator comprises a second plurality of circuits to perform a stage-2 SHA hash, and a second data path coupled between a second reference node and a second input node of the second plurality of circuits to feed a second padding bit of the plurality of padding bits to the second input node.

In Example 3, the subject matter of any of Examples 1 and 2 further provides that the first plurality of circuits is to perform a first plurality of rounds of compression on a first plurality of state data associated with the stage-1 SHA hash, and the second plurality of circuits is to perform a second plurality of rounds of compression on a second plurality of state data associated with the stage-2 SHA hash, wherein the hardware accelerator comprises a plurality of registers to store the second plurality of state data, and wherein the hardware accelerator comprises a third data path coupled between a third reference node supplying an initial value and at least one of the plurality of registers.

In Example 4, the subject matter of Example 1 further comprises a clock gate circuit to convert a system clock to a gated clock and to supply the gate clock to the first plurality of circuits, wherein the gated clock is to enable rounds 0 through 2 of the first plurality of rounds of compression, and disable the rounds 0 through 2 of the first plurality of rounds of compression.

In Example 5, the subject matter of Example 1 further provides that the input message comprises a nonce, and wherein the hardware accelerator comprises a plurality of data paths to feed bits of the nonce to circuits to perform a round 3 of the first plurality of rounds of compression.

In Example 6, the subject matter of any of Examples 1 and 5 further provides that responsive to an increment of the nonce, the hardware accelerator is to increment a same amount to at least one state data associated with the round 3 of the first plurality of rounds of compression.

In Example 7, the subject matter of Example 6 further provides that the hardware accelerator is to subtract a constant value from the at least one state data in rounds 4 through 6 of the first plurality of rounds of compression.

In Example 8, the subject matter of Example 7 further provides that the hardware accelerator is to perform the stage-1 SHA hash and stage-2 SHA hash sequentially to determine a validity of the nonce in Bitcoin mining, and wherein responsive to determine that the nonce is one of valid or invalid, the processor is to increment a value of the nonce to generate a new input message.

In Example 9, the subject matter of Example 1 further provides that the first data path comprises a hardwire coupled between the first reference node and the first input node, and wherein the first reference node supplies a fixed reference value.

Example 10 is an application specific integrated circuit (ASIC) comprising a first plurality of circuits to perform a stage-1 secure hash algorithm (SHA) hash based on an input message comprising a plurality of padding bits, and a data path coupled between a first reference node and a first input node of the first plurality of circuits to feed a first padding bit of the plurality of padding bits to the first input node.

In Example 11, the subject matter of Example 10 further provides that the ASIC comprises a second plurality of circuits to perform a stage-2 SHA hash; and a second data path coupled between a second reference node and a second input node of the second plurality of circuits to feed a second padding bit of the plurality of padding bits to the second input node.

In Example 12, the subject matter of any of Examples 10 and 11 further provides that the first plurality of circuits is to perform a first plurality of rounds of compression on a first plurality of state data associated with the stage-1 SHA hash, and the second plurality of circuits is to perform a second plurality of rounds of compression on a second plurality of state data associated with the stage-2 SHA hash, wherein the ASIC comprises a plurality of registers to store the second plurality of state data, and wherein the ASIC comprises a third data path coupled between a third reference node supplying an initial value and at least one of the plurality of registers.

In Example 13, the subject matter of Example 12 further comprises a clock gate circuit to convert a system clock to a gated clock and to supply the gate clock to the first plurality of circuits, wherein the gated clock is to enable rounds 0 through 2 of the first plurality of rounds of compression, and disable the rounds 0 through 2 of the first plurality of rounds of compression.

In Example 14, the subject matter of Example 10 further provides that the input message comprises a nonce, and wherein the ASIC comprises a plurality of data paths to feed bits of the nonce to circuits to perform a round 3 of the first plurality of rounds of compression.

In Example 15, the subject matter of any of Examples 10 and 14 further provides that responsive to an increment of the nonce, the ASIC is to increment a same amount to at least one state data associated with the round 3 of the first plurality of rounds of compression.

In Example 16, the subject matter of Example 15 further provides that the ASIC is to subtract a constant value from the at least one state data in rounds 4 through 6 of the first plurality of rounds of compression.

In Example 17, the subject matter of Example 16 further provides that the ASIC is to perform the stage-1 SHA hash and stage-2 SHA hash sequentially to determine a validity of the nonce in Bitcoin mining, and wherein responsive to determine that the nonce is one of valid or invalid, the processor is to increment a value of the nonce to generate a new input message.

In Example 18, the subject matter of Example 17 further provides that the first data path comprises a hardwire coupled between the first reference node and the first input node, and wherein the first reference node supplies a fixed reference value.

Example 19 is a method comprising receiving, by a hardware accelerator, an input message comprising a first padding bit, feeding, using a first data path coupled between a first reference node and a first input node of a first plurality of circuits, the first padding bit to the first input node of the first plurality of circuits to perform a stage-1 secure hash algorithm (SHA) hash, and performing, by the hardware accelerator, the stage-1 SHA hash based on the input message.

In Example 20, the subject matter of Example 19 further comprises providing, using a second data path coupled between a second reference node and a first input node of a second plurality of circuits, a second padding bit to the second input node of the second plurality of circuits to perform a stage-2 SHA hash, wherein the hardware accelerator is to perform the stage-1 SHA hash and stage-2 SHA hash sequentially to determine a validity of a nonce in Bitcoin mining.

Example 21 is an apparatus comprising: means for performing the method of any of Examples 19 and 20.

Example 22 is a machine-readable non-transitory medium having stored thereon program code that, when executed by a processor, perform operations comprising receiving, by a hardware accelerator, an input message comprising a first padding bit, feeding, using a first data path coupled between a first reference node and a first input node of a first plurality of circuits, the first padding bit to the first input node of the first plurality of circuits to perform a stage-1 secure hash algorithm (SHA) hash, and performing, by the hardware accelerator, the stage-1 SHA hash based on the input message.

In Example 23, the subject matter of Example 22 further provides that the operations further comprise providing, using a second data path coupled between a second reference node and a first input node of a second plurality of circuits, a second padding bit to the second input node of the second plurality of circuits to perform a stage-2 SHA hash, wherein the hardware accelerator is to perform the stage-1 SHA hash and stage-2 SHA hash sequentially to determine a validity of a nonce in Bitcoin mining.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system comprising:
   a processor to construct an input message comprising a nonce and a plurality of padding bits; and
   a hardware accelerator, communicatively coupled to the processor, the hardware accelerator comprising:
   a first plurality of circuits to compute a stage-1 secure hash algorithm (SHA) hash of the input message,
   a first data path coupled between a first reference node and a first input node of the first plurality of circuits to feed a first padding bit of the plurality of padding bits to the first input node, wherein the first data path comprises a hardwire coupled between the first reference node and the first input node, and wherein the first reference node supplies a fixed reference value,
   a second plurality of circuits to compute a stage-2 SHA hash, and
   a plurality of data paths to feed the nonce to the second plurality of circuits for performing a plurality of rounds of compression.

2. The processing system of claim 1, wherein the hardware accelerator further comprises a second data path coupled between a second reference node and a second input node of the second plurality of circuits to feed a second padding bit of the plurality of padding bits to the second input node.

3. The processing system of claim 2, wherein the first plurality of circuits is to perform a first plurality of rounds of compression on a first plurality of state data associated with the stage-1 SHA hash, and the second plurality of circuits is to perform a second plurality of rounds of compression on a second plurality of state data associated with the stage-2 SHA hash, wherein the hardware accelerator comprises a plurality of registers to store the second plurality of state data, and wherein the hardware accelerator comprises a third data path coupled between a third reference node supplying an initial value and at least one of the plurality of registers.

4. The processing system of claim 1, further comprising:
   a clock gate circuit to convert a system clock to a gate clock and to supply the gate clock to the first plurality of circuits, wherein the gate clock is to:
   enable rounds 0 through 2 of the first plurality of rounds of compression; and
   disable the rounds 0 through 2 of the first plurality of rounds of compression.

5. The processing system of claim 1 wherein responsive to an increment of the nonce, the hardware accelerator is to increment a same amount to at least one state data associated with the first plurality of rounds of compression.

6. The processing system of claim 5, wherein the hardware accelerator is to subtract a constant value from the at least one state data in rounds 4 through 6 of the first plurality of rounds of compression.

7. The processing system of claim 6, wherein the hardware accelerator is to compute the stage-1 SHA hash and stage-2 SHA hash sequentially to determine a validity of the nonce in Bitcoin mining, and wherein responsive to determine that the nonce is one of valid or invalid, the processor is to increment a value of the nonce to generate a new input message.

8. An application specific integrated circuit (ASIC) comprising:
   a first plurality of circuits to compute a stage-1 secure hash algorithm (SHA) hash based on an input message comprising a nonce and a plurality of padding bits; and
   a first data path coupled between a first reference node and a first input node of the first plurality of circuits to feed a first padding bit of the plurality of padding bits to the first input node, wherein the first data path comprises a hardwire coupled between the first reference node and the first input node, and wherein the first reference node supplies a fixed reference value;
   a second plurality of circuits to compute a stage-2 SHA hash; and
   a plurality of data paths to feed the nonce to the second plurality of circuits for performing a plurality of rounds of compression.

9. The ASIC of claim 8, wherein the ASIC further comprises a second data path coupled between a second reference node and a second input node of the second plurality of circuits to feed a second padding bit of the plurality of padding bits to the second input node.

10. The ASIC of claim 9, wherein the first plurality of circuits is to perform a first plurality of rounds of compression on a first plurality of state data associated with the stage-1 SHA hash, and the second plurality of circuits is to perform a second plurality of rounds of compression on a second plurality of state data associated with the stage-2 SHA hash, wherein the ASIC comprises a plurality of registers to store the second plurality of state data, and wherein the ASIC comprises a third data path coupled between a third reference node supplying an initial value and at least one of the plurality of registers.

11. The ASIC of claim 8, further comprising:
a clock gate circuit to convert a system clock to a gate clock and to supply the gate clock to the first plurality of circuits, wherein the gate clock is to:
enable rounds 0 through 2 of the first plurality of rounds of compression; and
disable the rounds 0 through 2 of the first plurality of rounds of compression.

12. The ASIC of claim 8, wherein responsive to an increment of the nonce, the ASIC is to increment a same amount to at least one state data associated with the first plurality of rounds of compression.

13. The ASIC of claim 12, wherein the ASIC is to subtract a constant value from the at least one state data in rounds 4 through 6 of the first plurality of rounds of compression.

14. The ASIC of claim 13, wherein the ASIC is to compute the stage-1 SHA hash and stage-2 SHA hash sequentially to determine a validity of the nonce in Bitcoin mining, and wherein responsive to determine that the nonce is one of valid or invalid, the processor is to increment a value of the nonce to generate a new input message.

15. A method comprising:
receiving, by a hardware accelerator, an input message comprising a nonce and a first padding bit;
feeding, using a first data path coupled between a first reference node and a first input node of a first plurality of circuits, the first padding bit to the first input node of the first plurality of circuits to compute a stage-1 secure hash algorithm (SHA) hash, wherein the first data path comprises a hardwire coupled between the first reference node and the first input node, and wherein the first reference node supplies a fixed reference value;
feeding, using a plurality of data paths, the nonce to a second plurality of circuits for performing a plurality of rounds of compression; and
performing, by the hardware accelerator, the stage-1 SHA hash based on the input message.

16. The method of claim 15, further comprising:
providing, using a second data path coupled between a second reference node and a first input node of the second plurality of circuits, a second padding bit to the second input node of the second plurality of circuits to compute a stage-2 SHA hash, wherein the hardware accelerator is to compute the stage-1 SHA hash and stage-2 SHA hash sequentially to determine a validity of a nonce in Bitcoin mining.

* * * * *